No. 619,755. Patented Feb. 21, 1899.
J. W. HYATT.
STRAINER FOR FILTERS.
(Application filed Nov. 12, 1898.)
(No Model.) 2 Sheets—Sheet 1.

WITNESSES:
Fr. N. Poehrich
James C. Reilly

INVENTOR
John W. Hyatt,
BY
J. E. Hindon Hyde
ATTORNEY

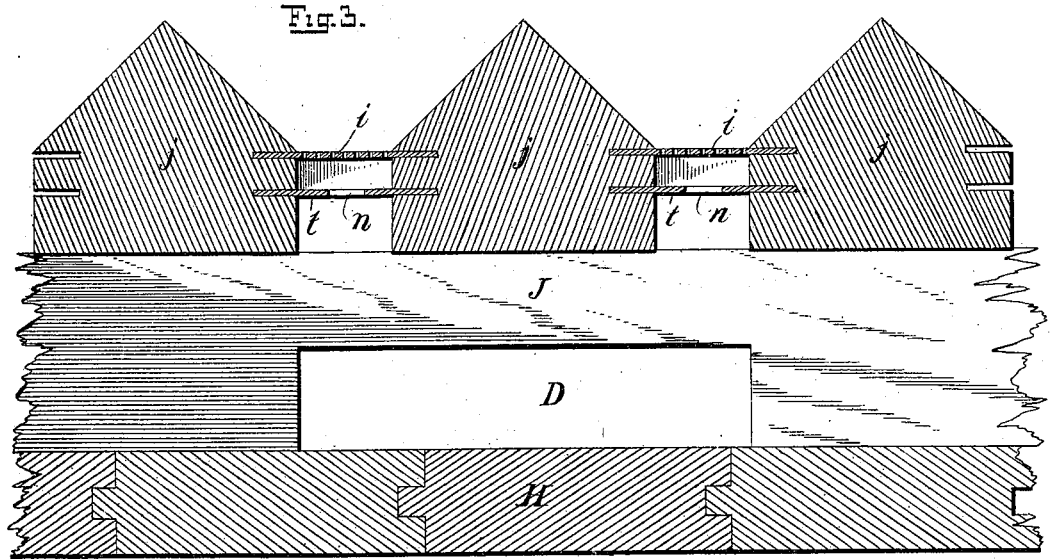
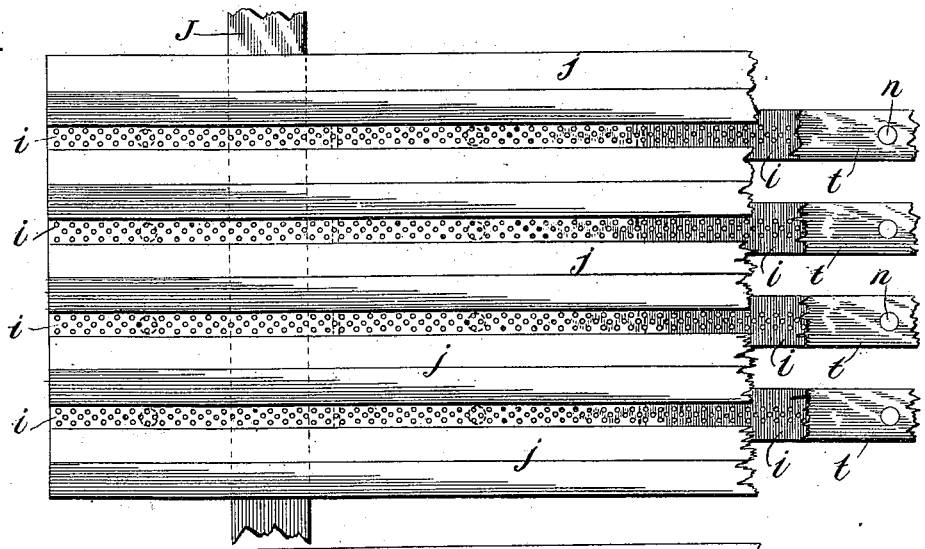
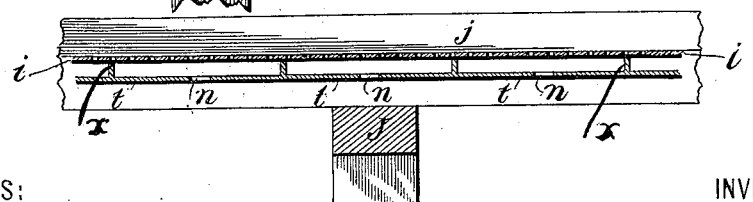

UNITED STATES PATENT OFFICE.

JOHN W. HYATT, OF NEWARK, NEW JERSEY, ASSIGNOR TO THE NEW YORK FILTER MANUFACTURING COMPANY, OF NEW YORK, N. Y.

STRAINER FOR FILTERS.

SPECIFICATION forming part of Letters Patent No. 619,755, dated February 21, 1899.

Application filed November 12, 1898. Serial No. 696,199. (No model.)

*To all whom it may concern:*

Be it known that I, JOHN W. HYATT, a citizen of the United States, and a resident of the city of Newark, in the county of Essex and State of New Jersey, have invented certain new and useful Improvements in the Construction of Strainers for Filters, of which the following is a specification.

The invention relates to the construction of a strainer or bed upon which the sand or other filtering material rests; and it consists in peculiar features by which the strainer allows the escape of the filtered water without the accompaniment of any of the filtering material, and also admits the wash-water for washing the filter-bed to all parts of such filter-bed.

I have shown my invention in connection with a well-known type of gravity-filter, in which there are two chambers, the upper chamber containing the filtering material and constituting the filter-chamber proper and a lower sediment-chamber, although I do not confine my invention to this peculiar type of filter, for it may be used in any suitable filter.

My invention is illustrated in the accompanying drawings, in which—

Figure 1:
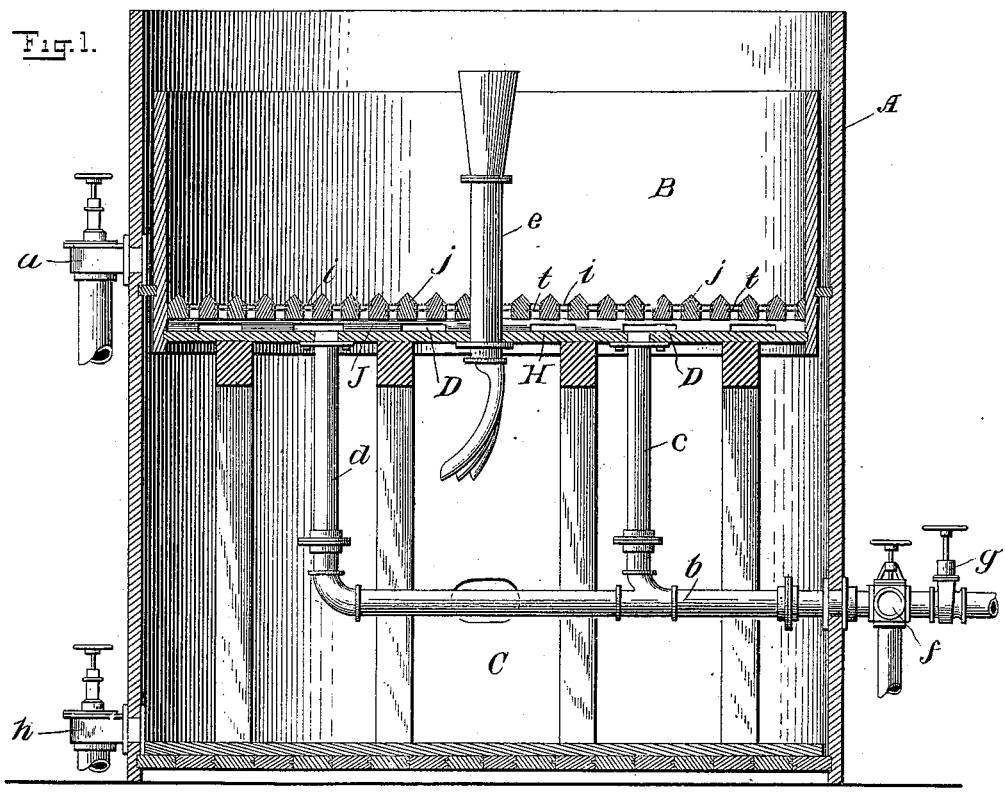
Figure 2:
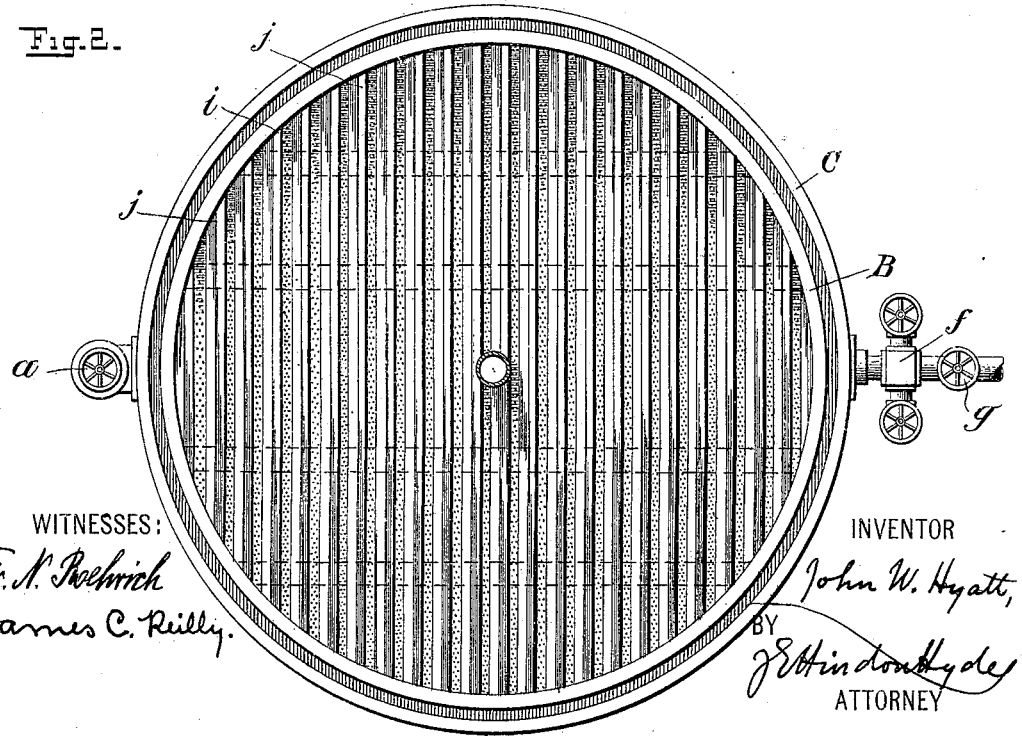

Figure 1 is a part-sectional and part-perspective view of the apparatus. Fig. 2 is a plan view. Fig. 3 is a sectional view of a portion of the filter-bed. Fig. 4 is a plan view of a portion of the filter-bed, and Fig. 5 is a sectional view showing certain details of my device.

Referring to the drawings, Figs. 1 and 2, A is the outer case of the filter, which is divided into two chambers. The upper chamber B is that which contains the filtering material (not shown) and C is the sediment-chamber. The valve and pipe $a$ are the outlet for the wash-water from the chamber B, this water overflowing from the chamber B into the annular recess between such chamber and the outer case A and out through the valve and pipe $a$. A rotatable wash-pipe for the sediment-chamber C is shown at $e$, means for rotating this pipe not being shown. The pipe $b$ is divided into two chambers $d$ and $c$, which communicate with the bottom of the filtering-chamber B and furnish an outlet for the filtered water as well as an inlet for the wash-water. The valves $f$ and $g$ are valves for the outlet of the filtered water and the inlet for the wash-water, the valve $f$ being a double valve, as shown, to permit of washing with either filtered or unfiltered water, as desired. The valve $h$ is the outlet-valve for the wash-water and the sediment from the chamber C. Resting upon the water-tight bottom H of the filtering-chamber B and suitably secured thereto is a strainer, and it is to the construction of this strainer that my invention relates.

Upon the water-tight bottom H of the filter-chamber B, which is pierced by the pipes $c\ d$, are placed the foundation-beams J for the false bottom. These beams are pierced at suitable intervals with openings D, which allow free access of water to all parts of the filter-chamber. Resting upon these beams there are transverse ribs $j$, having their upper surfaces, as shown, in the form of two inclined planes, though I do not confine myself to this form, for they might be of conical, semicircular, or any other suitable shape in cross-section. I prefer, however, to have them in the shape shown to prevent the lodgment of the filtering material thereon. These transverse ribs $j$ are placed at convenient intervals apart, and between them I insert perforated plates $t$, Figs. 1, 3, 4, and 5. The perforations $n$ in these plates are placed at suitable distances apart—say twelve inches, more or less—and are of such size as will allow a requisite amount of wash-water sufficient for each unit of screen-surface to pass to the filter-bed, these units of surface being established by the stops $x$, Fig. 5, placed on either side of each perforation and at a distance of about twelve inches apart. These stops are intended to divide the inflowing wash-water into a number of units in order that all parts of the filter-bed may be properly washed. It is well known that water will flow in the line of least resistance, and as it might happen that some portions of the water-channels might be blocked by silt or even by filtering material I have placed these stops at suitable intervals from the inlets for the wash-water to insure a pressure of the water upon such impeded passages, so as to clear away the obstructions. The aggregate of these holes $n$ should be of less capacity than that of the main inlet-pipe for the wash-water. A short distance above the plate *t* I place the perforated plates *i*, likewise secured longitudinally in or to the ribs *j*. These plates *i* are pierced with perforations of a size that will permit water to pass through, but will not permit the escape of the sand or filtering material which rests upon them, and the aggregate capacity of these fine perforations should be much greater per unit of surface than that of the perforations in the lower plates *t*. The upper plates *i* should be perforated very freely with small perforations, owing to the fact that many of the perforations will in the operation of the apparatus be more or less obstructed by grains of the filtering material, and therefore there should be provided a sufficient number of perforations to insure the passage of the water in both directions—that is, when filtering and also in washing. It will be seen that by this construction the wash-water is made to flow to all of the lower portion of the filtering material, so that none of it escapes washing.

Although I have shown my device in a form which contains two sets of plates which connect the transverse ribs and cover the water-channels, the lower of said plates having large perforations and the upper plates having small perforations, and although I prefer this construction, yet the lower plates containing the large perforations are not essential to the operation of my device, for in some cases they may be omitted, if desired.

Having thus described my invention, what I claim, and desire to secure by Letters Patent, is—

1. In a filter, a strainer consisting of a series of ribs whose upper surfaces are shaped in cross-section in the form of a section of a cone, with intermediate channels for the water between said ribs, and said ribs being connected below their tops by perforated plates which serve as a covering to the water-channels, substantially as described.

2. In a filter, a strainer consisting of a series of ribs with intermediate troughs or channels for the water covered by two sets of perforated plates, the lower of said plates having perforations, substantially as described, and the upper of said plates having finer perforations, as described, all as and for the purpose set forth.

3. In a filter, a strainer consisting of a series of ribs whose upper surfaces are shaped in cross-section in the form of a section of a cone, with intermediate channels for the water divided by stops, substantially as described, and said ribs being connected below their tops by perforated plates which serve as a covering to the water-channels, substantially as described.

4. In a filter, a strainer consisting of a series of ribs with intermediate channels for the water divided by a series of stops, substantially as described, said channels being covered by two sets of perforated plates, the lower of said plates having perforations, substantially as described, and the upper of said plates having finer perforations, as described, all as and for the purpose set forth.

JOHN W. HYATT.

Witnesses:
J. E. HINDON HYDE,
JAMES C. REILLY.